J. N. HICKS.
Horse Rake.
No. 75,548.
Patented March 17, 1868.
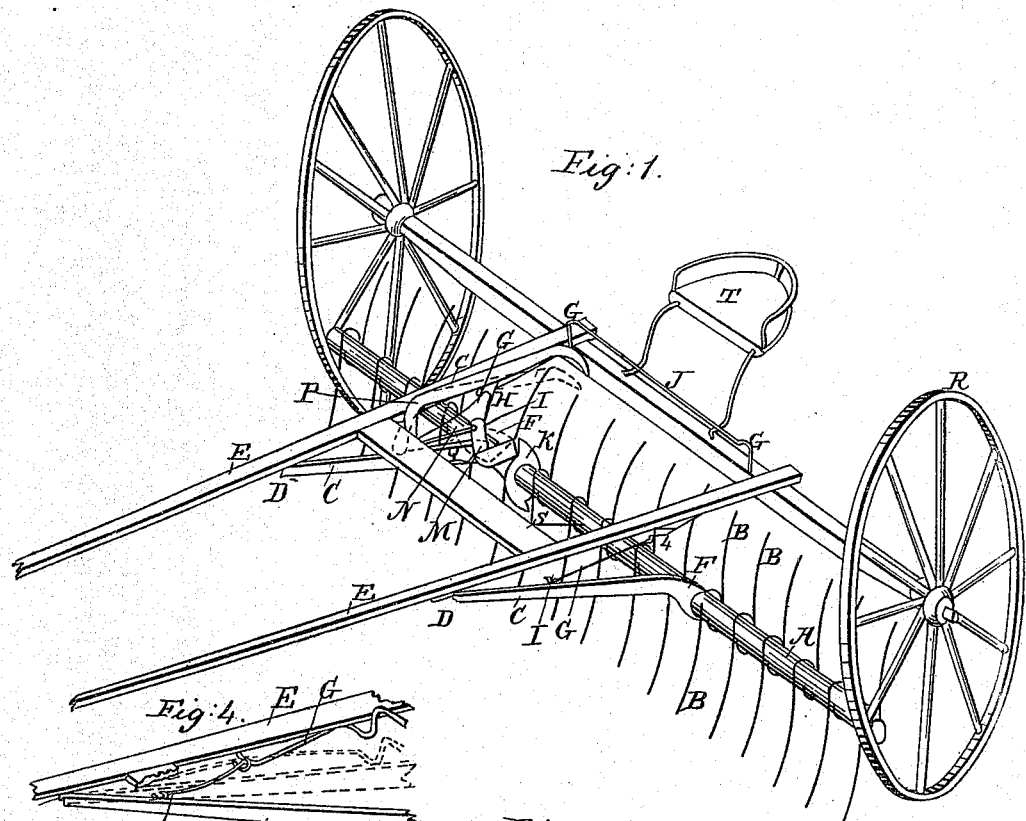
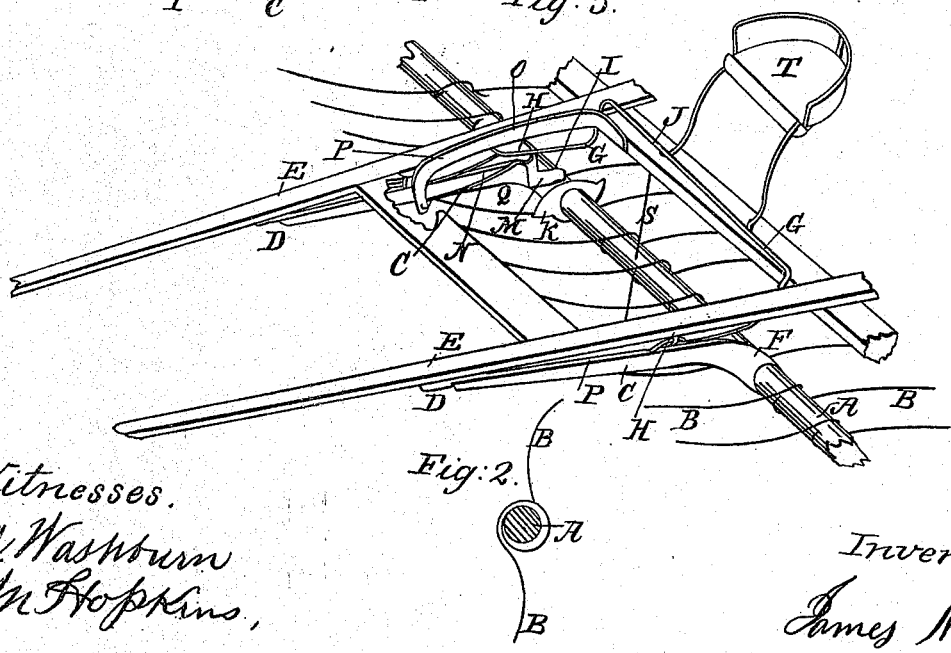
Witnesses.
H. A. Washburn
Geo. M. Hopkins
Inventor.
James N. Hick

United States Patent Office.

JAMES N. HICKS, OF BARRE CENTRE, NEW YORK.

*Letters Patent No. 75,548, dated March 17, 1868.*

IMPROVEMENT IN HORSE-RAKES.

The Schedule referred to in these Letters Patent and making part of the same.

TO ALL WHOM IT MAY CONCERN:

Be it known that I, JAMES N. HICKS, of Barre Centre, in the county of Orleans, and State of New York, have invented a new and useful Improvement in Horse-Rakes; and I do hereby declare that the following is a full, clear, and exact description of the construction and operation of the same, reference being had to the accompanying drawings, making a part of this specification, in which—

Figure 1 is a perspective view.

Figures 2, 3, and 4 are views of detached portions.

In fig. 1, A represents a bar of wood, or other material, through which the wires B B, &c., pass, and are fastened. The manner in which the wires are fastened is shown in fig. 2. They are passed through the bar A, and bent in such a way as to form a coil around it. The bar A is sustained and held in place by the arms C C, which are hinged at D D to the thills E E, and are fitted with boxes at F F for the reception of the bar A, which revolves freely in them. G is a rod, which is bent so as to act as a lever for each side. This rod G passes through eyes H H in the thills, which form a fulcrum, and through the eyes I I in the arms C C. The part of this lever G designated by J runs parallel with the axle of the rake. K is a ratchet, which is fixed to the bar A, having two teeth situated on the same sides of the bar as the rake-teeth B B. L is a pawl attached to the arm A, which engages with the ratchet K. This pawl is bent at a right angle, and moves on and is held in place by the pin M. N is a rod which connects the pawl L with the lever O, which is bent in the form of a right angle, with its short arm extending downward, while the long arm runs parallel with the thill, to which it is attached by the bolt P. Q is a spring which throws the pawl on to the ratchet. The thills E E are attached to the axle in the ordinary way. The wheels R R are of sufficient height to allow the teeth of the rake to just touch the ground. S is a rod, which is placed through the bar A, at right angles with the teeth B B, and of about the same length. T is a seat for the convenience of the driver.

I will describe the manner in which my rake operates: When the rake is full and it is desired to dump it, the driver presses down the lever O with his foot, which, by means of its connection with the pawl L, releases the ratchet K, (see red lines in fig. 1,) and allows the bar A to turn. The rod S facilitates the turning of the bar A by striking the ground when the teeth have made a quarter turn.

If it is desired to transport the rake, the teeth B B are turned up parallel with the thills, when the lever G is pressed with the foot, which raises the arms C C, and with it the rake-head, (see red lines in fig. 4; also see fig. 3.)

What I claim as new, and desire to secure by Letters Patent, is—

1. I claim the revolving wire-toothed rake-head, formed of the bar A and the teeth B B, &c., in combination with the arms C C and the lever G, substantially as shown and described, and for the purpose set forth.

2. I claim the ratchet K and the pawl L, in combination with the lever O, operating for the purpose and in the manner shown and described.

3. I claim the lever G, in combination with the arms C C, operating for the purpose and in the manner above shown and described.

The above specification of my invention signed by me, this 23d day of October, 1867.

JAMES N. HICKS.

Witnesses:
H. A. WASHBURN,
GEO. M. HOPKINS.